United States Patent [19]

Sundholm

[11] Patent Number: 4,961,598
[45] Date of Patent: Oct. 9, 1990

[54] WELDED PIPE JOINT

[76] Inventor: Göran Sundholm, Magistervägen 34 B, Grankulla, Finland, SF-02700

[21] Appl. No.: 368,314
[22] PCT Filed: Jan. 28, 1988
[86] PCT No.: PCT/FI88/00012
§ 371 Date: May 23, 1989
§ 102(e) Date: May 23, 1989
[87] PCT Pub. No.: WO88/05881
PCT Pub. Date: Aug. 11, 1988

[30] Foreign Application Priority Data
Jan. 30, 1987 [FI] Finland ................ 870423

[51] Int. Cl.$^5$ .............................................. F16L 00/07
[52] U.S. Cl. ........................................ 285/94; 285/24; 285/286; 285/404
[58] Field of Search .......... 285/294, 297, 94, 286, 285/24, 404

[56] References Cited
U.S. PATENT DOCUMENTS

| | | | |
|---|---|---|---|
| 1,816,770 | 7/1931 | Gradl | 285/297 X |
| 2,855,224 | 10/1958 | Boice | 285/286 X |
| 3,600,010 | 8/1971 | Downs | 285/286 X |
| 3,843,170 | 10/1974 | Bagnulo | 285/286 X |

FOREIGN PATENT DOCUMENTS

| | | | |
|---|---|---|---|
| 716467 | 8/1965 | Canada | 285/297 |
| 8518 | 1/1977 | Japan | 285/297 |
| 167884 | 6/1934 | Switzerland | 285/297 |

Primary Examiner—Dave W. Arola
Attorney, Agent, or Firm—Ladas & Parry

[57] ABSTRACT

The invention relates to a welded pipe joint comprising a sleeve (3) welded (5, 6) at each end thereof to the respective pipe (1, 2). The wall of the sleeve (3) at each pipe provided with a boring in which a nipple (11, 12) for oil is arranged. In connection with each nipple, a peripheral groove (15 16) is arranged to extend around the respective pipe (1, 2). Oil introduced through the nipples (11, 12) prevents pickling acid from entering clearances (9, 10) between the pipes (1, 2) and the sleeve (3), and impurities from gathering in gaps (7, 8) between the end faces of the pipes and a central shoulder (4) formed internally in the sleeve.

5 Claims, 3 Drawing Sheets

WELDED PIPE JOINT

The present invention relates to a welded pipe joint comprising a sleeve for receiving the end portion of at least one pipe to be joined, said sleeve being, at the respective end thereof, welded to the respective pipe.

Welded joints of this type have been known for a long time, and are still used widely due to their good strength and simple installation.

These pipe joints, however, have a serious drawback; attempts to make the joints sufficiently clean internally have previously been unsuccessful. This is because there is a narrow clearance between the inside of the sleeve and the outside of the pipes and pickling liquid (acid) enters this clearance whereas the neutralizing liquid applied thereafter is not able to flush it off. The remaining acid affects adversely the weld joints in particular. In addition, there is a gap between the end face of the pipe and a respective shoulder formed internally in the sleeve, and this gap gathers impurities both during flushing and regular operation, which impurities eventually come loose and cause serious disturbances.

The object of the present invention is to provide a new welded pipe joint of the type described in the beginning and by means of which the above problems can be solved.

The pipe joint according to the invention is mainly characterized in that in the wall of the sleeve, at the pipe received therein, there is formed a through-going boring for introducing a lubricant, and that a peripheral groove is formed in connection with said boring for distributing the lubricant.

The boring is preferably positioned in the vicinity of the sleeve end and it is threaded, as well as a nipple for the lubricant. The groove may be formed either on the inside of the sleeve or on the outside of the pipe. The latter alternative facilitates correct positioning of the pipe end.

The lubricant, usually oil, forced in prior to the pickling prevents the corrosive pickling acid from entering in between the pipe and the sleeve. Oil impacted during the flushing and regular operation prevents impurities from gathering in the gaps at the end faces of the pipes.

In the following the invention will be described with reference to the the attached drawing.

Figure 1:
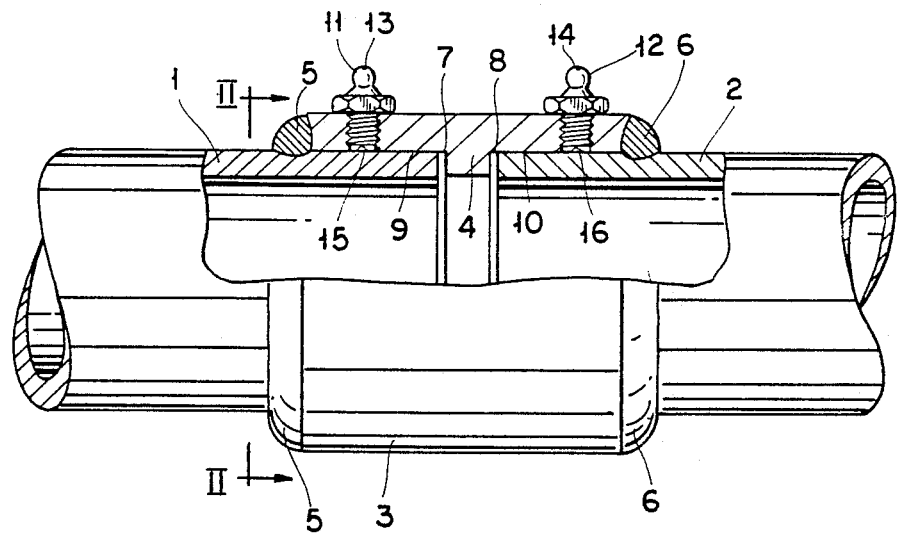
FIG. 1 is a partial longitudinal section of a first embodiment of a pipe joint according to the invention.
Figure 2:
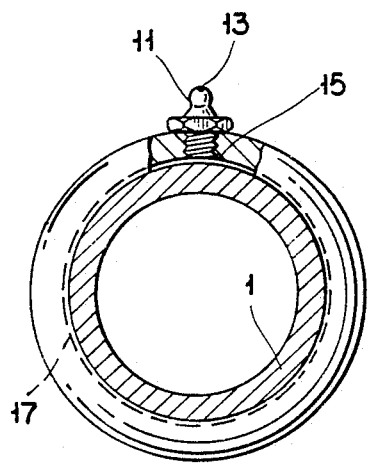
FIG. 2 is a cross-sectional view along the line II—II shown in 1.

In FIGS. 1 and 2, the reference numerals 1 and 2 designate two pipes to be joined. 3 designates a sleeve with a central annular shoulder 4 formed internally therein; 5 and 6 designate weld joints at both ends of the sleeve 3. In a welded pipe joint of this type, there are annular gaps 7 and 8 between the end faces of the pipes 1 and 2 and the shoulder 4, and narrow clearances 9 and 10 between the pipes and the sleeve. The annular gaps 7 and 8 are required in order to permit linear expansion of the pipes 1 and 2 within the sleeve during the welding operation.

When internal cleanness is required, the gaps 7 and 8 as well as the clearances 9 and 10 have caused an insolvable problem. The internal cleaning is carried out by means of a pickling liquid, i.e. acid, whereafter flushing is effected with a neutralizing liquid. The neutralizing liquid is not able to remove the pickling liquid from the clearances 9 and 10 which results in that the weld joints 5 and 6 in particular are gradually corroded internally. In addition the gaps 7 and 8 gather impurities which come loose during the regular operation in more or less large lumps which cause serious disturbances.

The present invention solves the problem by means of lubricant nipples 11, 12 provided in borings formed in the wall of the sleeve 3. Peripheral grooves 15 and 16 are arranged in connection with the borings for the even distribution of a lubricant, usually oil, injected through the nipples 11 and 12 around the pipes 1 and 2. Conduits in the nipples 11 and 12 are designated with 13 and 14. In the embodiment of FIGS. 1 and 2, the grooves 15 and 16 are formed on the inside of the sleeve 3. In FIG. 2, the broken line 17 designates the bottom of the annular groove 15.

Prior to and possibly also during the pickling oil is introduced through the nipples 11 and 12, so that it fills the clearances 9 and 10 and passes out through the gaps 7 and 8, thus preventing the pickling liquid from entering the gaps 9 and 10. During the flushing and regular operation, the oil prevents impurities from gathering in the gaps 7 and 8. When the nipples are positioned relatively close to the weld joints 5 and 6, it can be ensured that the pickling liquid cannot reach these. The nipples 11 and 12 are preferably screwed into each boring in the shell of the sleeve 3.

Figure 3:
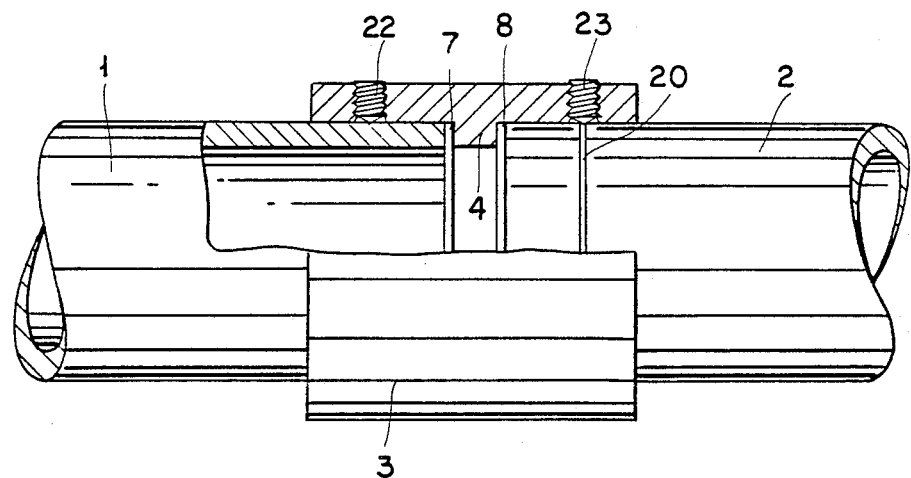
FIG. 3 is a partial longitudinal section of a second embodiment of a pipe joint according to the invention.

The embodiment of FIG. 3 differs from the one of FIGS. 1 and 2 in that the peripheral grooves in connection with the boring through the wall of the sleeve 3 are formed on the outside of the pipe ends received in the sleeve. The groove of the pipe 2 is designated 20.

These grooves in the pipe surface facilitate correct positioning of the pipes 1 and 2 in relation to each other and in relation to the sleeve e.g. by means of screws 22 and 23 having a pointed end. The conventional internal shoulder 4 of the sleeve 3, earlier needed to ensure correct positioning, can be omitted and the two gaps 7 and 8 on either side of the shoulder 4 are reduced to one.

After positioning the pipes and welding them to the sleeve the screws 22 and 23 are replaced by lubricant nipples, as shown in FIGS. 1 and 2, for the time of the internal cleaning process. Thereafter the screws 22 and 23 may be locked in the respective borings.

Figure 4:
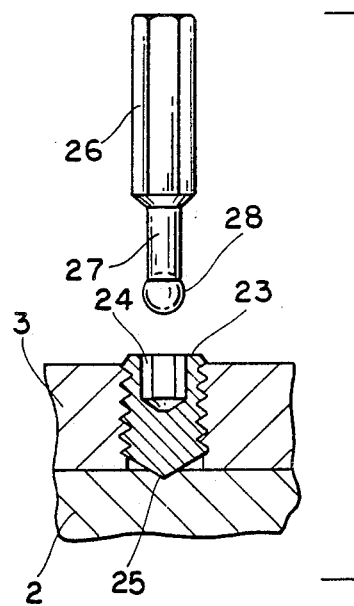
FIG. 4 is an enlarged longitudinal section of the area A in FIG. 3.

One way of doing this is illustrated in FIG. 4. The screw 23 has a hexagon socket 24 and a cone point 25. An expansion ball 28, preferably of metal, is forced into the socket 24 by means of a tool 26 with a magnetic head 27.

During the welding process, a protective gas can be introduced through the boring of the sleeve 3 in order to reduce the formation of slag and oxides on the internal surfaces later to be cleaned. The protective gas can be fed in through nipples like 11 and 12, or by providing the screws 22 and 23 will feed bores, or by using separate means to be fitted into the borings through the wall of the sleeve 3.

The invention can, of course, be applied to various branched joints as well as to the straight joints shown in the drawing, or to a joint with only one pipe end, if one end of the sleeve 3 is joined to a fixed connection, e.g. a pump.

Figure 5:
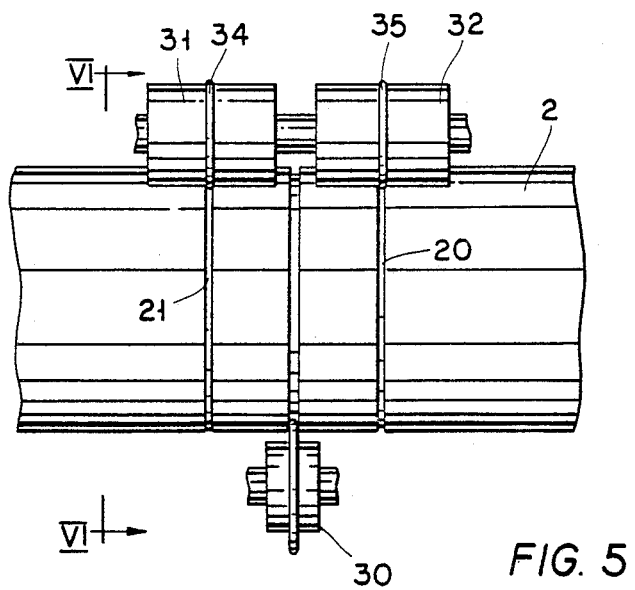
FIGS. 5 and 6 illustrate a preferred method of cutting a pipe, FIG. 6 being a cross-sectional view along the line VI—VI in FIG. 5, for the embodiment of FIG. 3.
Figure 6:
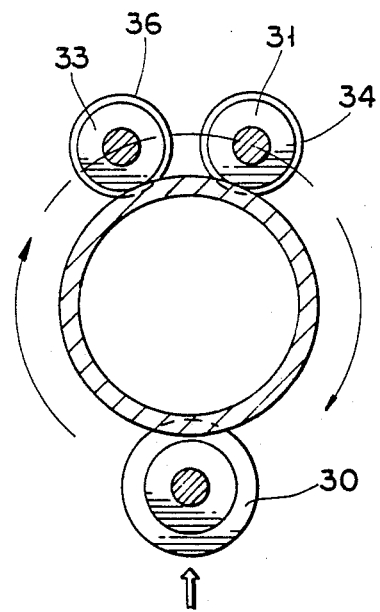

FIGS. 5 and 6 schematically illustrate one way of providing the outer pipe surface with a groove at a predetermined distance from the pipe end. Reference numeral 30 designates a cutting wheel, numerals 31, 2 and 33 designate supporting wheels each provided with a peripheral edge 34, 35 and 36, respectively. A fourth supporting wheel is behind the wheel 32 in FIG. 5.

The cutting wheel and the supporting wheels are interconnected and rotate together around a pipe to be cut. While the cutting wheel cuts through the pipe the peripheral edges of the supporting wheels form grooves 20 and 21, each at a predeterminal distance from the pipe end.

What is claimed is:

1. A socket weld fitting to join at least two pipes together, comprising a socket, having an internal annular shoulder extending inwards from an internal surface of said socket, for receiving end portions of said pipes so that a gap is formed, between said annular shoulder and an end surface of said end portions, and a narrow radial clearance is formed between said internal surface and an external surface of said end portions, and wherein said end portions are welded to end parts of said socket and at least two bores are provided through said socket for introducing a lubricant to said gap and said clearance, and that a peripheral annular groove, adjacent to each said bore, is formed to distribute said lubricant.

2. A socket weld fitting according to claim 1, wherein said bores are positioned in the vicinity of said end parts.

3. A socket weld fitting according to claim 1, wherein said bores are threaded.

4. A socket weld fitting according to claim 1, wherein said annular groove is formed in said internal surface.

5. A socket weld fitting according to claim 1, wherein said annular groove is formed in said external surface.

* * * * *